US008886635B2

(12) United States Patent
Cho et al.

(10) Patent No.: US 8,886,635 B2
(45) Date of Patent: Nov. 11, 2014

(54) APPARATUS AND METHOD FOR RECOGNIZING CONTENT USING AUDIO SIGNAL

(75) Inventors: Hoon-young Cho, Gyeonggi-do (KR); Jaehyung Lee, Gyeonggi-do (KR); Chandra Shekhar Dhir, Seoul (KR)

(73) Assignee: Enswers Co., Ltd., Seoul (KR)

( * ) Notice: Subject to any disclaimer, the term of this patent is extended or adjusted under 35 U.S.C. 154(b) by 106 days.

(21) Appl. No.: 13/639,834

(22) PCT Filed: Jun. 8, 2012

(86) PCT No.: PCT/KR2012/004537
§ 371 (c)(1),
(2), (4) Date: Oct. 5, 2012

(87) PCT Pub. No.: WO2013/176329
PCT Pub. Date: Nov. 28, 2013

(65) Prior Publication Data
US 2013/0318071 A1    Nov. 28, 2013

(30) Foreign Application Priority Data
May 23, 2012  (KR) ......................... 10-2012-0054659

(51) Int. Cl.
*G06F 17/30* (2006.01)
*G10L 25/54* (2013.01)

(52) U.S. Cl.
CPC ...... *G06F 17/3074* (2013.01); *G06F 17/30743* (2013.01); *G10L 25/54* (2013.01)
USPC ........................................................ 707/722

(58) Field of Classification Search
USPC ........................................................ 707/722
See application file for complete search history.

(56) References Cited

U.S. PATENT DOCUMENTS

2004/0098225 A1* 5/2004 Abe et al. ...................... 702/181
2006/0013451 A1* 1/2006 Haitsma ........................ 382/124
(Continued)

FOREIGN PATENT DOCUMENTS

EP   WO 02/11123 A2    2/2002
KR   10-0811835         3/2003
(Continued)

OTHER PUBLICATIONS

International Search Report, mailing date Feb. 21, 2013 for corresponding International Application No. PCT/KR2012/004537.

*Primary Examiner* — Jay Morrison
(74) *Attorney, Agent, or Firm* — Intellectual Property Law Group LLP

(57) ABSTRACT

The present invention relates to an apparatus and method for recognizing content using an audio signal. The content recognition apparatus includes a query fingerprint extraction unit for forming frames having a preset frame length for an audio signal, and generating frame-based feature vectors for respective frames, thus extracting a query fingerprint. A reference fingerprint DB stores reference fingerprints to be compared with the query fingerprint and pieces of content information corresponding to the reference fingerprints. A fingerprint matching unit determines a reference fingerprint matching the query fingerprint. In this case, the query fingerprint extraction unit forms the frames while varying a frame shift size that is an interval between start points of neighboring frames in a partial section. According to the present invention, there can be provided a content recognition apparatus and method which can maintain the accuracy and reliability of matching while promptly providing results.

17 Claims, 8 Drawing Sheets

(56) References Cited

U.S. PATENT DOCUMENTS

| | | | |
|---|---|---|---|
| 2006/0041753 A1* | 2/2006 | Haitsma | 713/176 |
| 2006/0155399 A1* | 7/2006 | Ward | 700/94 |
| 2009/0019025 A1* | 1/2009 | Chen | 707/5 |
| 2009/0157391 A1* | 6/2009 | Bilobrov | 704/200.1 |
| 2009/0313226 A1* | 12/2009 | Bennett | 707/3 |
| 2011/0071838 A1* | 3/2011 | Li-Chun Wang et al. | 704/270 |
| 2012/0110608 A1* | 5/2012 | Berkowitz et al. | 725/14 |
| 2013/0259211 A1* | 10/2013 | Vlack et al. | 379/88.01 |
| 2013/0275421 A1* | 10/2013 | Resch et al. | 707/725 |

FOREIGN PATENT DOCUMENTS

| | | |
|---|---|---|
| KR | 10-0456408 | 11/2004 |
| KR | 20070044251 | 5/2007 |
| KR | 10-2007-0060978 | 6/2007 |
| KR | 2007-0054601 | 6/2007 |
| KR | 10-2007-0071633 | 7/2007 |
| KR | 10-2007-0091587 | 9/2007 |
| KR | 10-2008-0051688 | 6/2008 |
| KR | 10-0893123 | 11/2008 |
| KR | 10-0888804 | 1/2009 |

* cited by examiner

APPARATUS AND METHOD FOR RECOGNIZING CONTENT USING AUDIO SIGNAL

TECHNICAL FIELD

The present invention relates, in general, to an apparatus and method for recognizing content using an audio signal and, more particularly, to an apparatus and method that are capable of providing matching content information based on the fingerprints of an input audio signal.

BACKGROUND

With the development of network and Internet technology and the rapid propagation of mobile communication terminals such as smart phones, various services using audio or video have been provided over a network. Further, along with these services, as methods of determining the identicalness of audio or video, there have been widely used methods using a fingerprint, and there have been proposed technologies for recognizing various pieces of audio or video using fingerprints over a network.

Technologies for recognizing audio or video using fingerprints are implemented using a method of generating the feature vectors of frames while dividing a given audio or video signal into frames, and of performing matching using the feature vectors. Such a conventional fingerprint generation and matching method is problematic in that the computational complexity is high, so that time is required to generate and match fingerprints, and a load is imposed on network resources. In order to solve this problem, the number of fingerprints to be generated may be decreased, or a matching process may be simplified, but this results in the problem of deteriorating matching accuracy.

Korean Patent Registration No. 10-0456408 (Date of Publication: Nov. 10, 2004) relates to an "Audio gene generation method and audio data search method", and discloses an audio gene generation method including the time division step of dividing an audio signal into regular time intervals; the frequency conversion step of calculating the magnitudes of frequency signals at regular time intervals or included in a plurality of time intervals; the difference calculation step of dividing a frequency domain into predetermined sections and calculating differences between the magnitudes of signals present in neighboring frequency sections; the gradient calculation step of obtaining a difference between the calculated values in neighboring time intervals; the quantization step of quantizing a value to 1 when the gradient is equal to or greater than 0, and to 0 when the gradient is less than 0; and the audio gene generation step of storing the quantized values and generating audio genes.

However, this technology is limited in that the computational complexity is high, and the fingerprint extraction procedure is complicated, thus imposing a load while requiring an excessively long time to calculate results.

Therefore, there is required the development of a fingerprint extraction and matching method that are capable of providing accurate results within a short period of time without imposing a load.

SUMMARY OF INVENTION

Technical Problem

Accordingly, the present invention has been made keeping in mind the above problems, and an object of the present invention is to provide an apparatus and method for recognizing content using an audio signal, which can promptly provide matching results while maintaining the accuracy and reliability of matching.

Another object of the present invention is to provide an apparatus and method that variably configure a frame shift size, which is an interval between the start points of frames, in a section having a large amount of information while dividing an input audio signal into a plurality of frames, thus maintaining accuracy and promptly providing matching results.

Technical Solution

In order to accomplish the above objects, the present invention provides an apparatus for recognizing content using an audio signal, including a query fingerprint extraction unit for forming frames having a preset frame length for an audio signal, and generating frame-based feature vectors for respective frames, thus extracting a query fingerprint; a reference fingerprint database (DB) for storing reference fingerprints to be compared with the query fingerprint and pieces of content information corresponding to the reference fingerprints; and a fingerprint matching unit for determining a reference fingerprint matching the query fingerprint, wherein the query fingerprint extraction unit forms the frames while varying a frame shift size that is an interval between start points of neighboring frames in a partial section.

In this case, the frame shift size may be shorter than the frame length so that neighboring frames overlap each other.

Further, the query fingerprint extraction unit may form the frames by causing the frame shift size in the partial section to be shorter than a preset frame shift size.

Further, the query fingerprint extraction unit may determine the partial section based on a preset time section.

Furthermore, the query fingerprint extraction unit may detect a time section in which a Signal to Noise (S/N) ratio has a value greater than a threshold, and determine the partial section based on the detected time section.

Furthermore, the query fingerprint extraction unit may generate frame-based feature vectors for respective frames corresponding to the determined partial section.

Furthermore, the query fingerprint extraction unit may generate frame-based feature vectors for respective frames to be included in the determined partial section, based on frame-based feature vectors for frames corresponding to start and end positions of the partial section.

Furthermore, the frame corresponding to the start position of the partial section may be a frame having the start position as a last position of the frame, and the frame corresponding to the end position of the partial section may be a frame having the end position as a first position of the frame.

Furthermore, the frame-based feature vectors of the frames corresponding to the start and end positions of the partial section may be generated, and the frame-based feature vectors of the respective frames to be included in the partial section may be generated using linear interpolation based on the generated frame-based feature vectors.

Furthermore, the frame-based feature vectors for respective frames corresponding to the start and end positions of the partial section may be generated in a form of binary numbers, and the feature-based feature vectors of the respective frames to be included in the partial section may be generated by comparing individual bits of the frame-based feature vectors generated in the form of the binary numbers and by arranging possible binary numbers in different bits.

Furthermore, the fingerprint matching unit may include a first matching unit for performing primary matching by determining reference fingerprints including a frame-based feature vector matching any one of the frame-based feature vectors constituting the query fingerprint, and by including identifiers of the determined reference fingerprints in a matching candidate group; and a second matching unit for performing secondary matching on the reference fingerprints corresponding to the identifiers included in the matching candidate group.

Furthermore, the first matching unit may determine a reference fingerprint including a frame-based feature vector, from which a Hamming distance to any one of the frame-based feature vectors constituting the query fingerprint is equal to or less than a threshold, to be a matching reference fingerprint.

Furthermore, the first matching unit may be configured such that if a matching frame is detected while the frame-based feature vectors constituting the query fingerprint are sequentially compared with the frame-based feature vectors of each reference fingerprint, a comparison of remaining frames is omitted and a comparison of a subsequent reference fingerprint is performed.

Furthermore, the second matching unit may reconstruct frame-based feature vectors, with exception of frames other than frames corresponding to the preset frame shift size from frame-based feature vectors constituting the query fingerprint, and compare the reconstructed frame-based feature vectors with the reference fingerprints.

Furthermore, the apparatus may further include a recognition result provision unit for providing content information corresponding to the reference fingerprint determined by the fingerprint matching unit.

Furthermore, the content recognition apparatus using an audio signal may be included in a client terminal.

Furthermore, the reference fingerprint DB may receive the reference fingerprints and the content information from a reference fingerprint server, and store the reference fingerprints and the content information.

Furthermore, the apparatus may further include an interface provision unit for providing a user interface allowing a user to input an audio signal.

Furthermore, content information corresponding to the reference fingerprint determined by the fingerprint matching unit may be transmitted to the reference fingerprint server.

Furthermore, the query fingerprint extraction unit may extract section-based query fingerprints by generating frame-based feature vectors for frames included in each preset section, and the fingerprint matching unit may determine a reference fingerprint matching each query fingerprint, and the query fingerprint extraction unit may continuously extract section-based query fingerprints in the respective preset sections until a matching reference fingerprint is determined by the fingerprint matching unit.

According to another aspect of the present invention, there is provided a method of recognizing content using an audio signal, including 1) forming frames having a preset frame length for an input audio signal, and generating frame-based feature vectors for respective frames, thus extracting a query fingerprint; and 2) determining a reference fingerprint matching the query fingerprint, wherein 1) is configured to form the frames while varying a frame shift size that is an interval between start points of neighboring frames in a partial section.

In this case, 2) may include 2-1) performing primary matching by determining reference fingerprints matching any one of the frame-based feature vectors constituting the query fingerprint, and by including identifiers of the determined reference fingerprints in a matching candidate group; and 2-2) performing secondary matching on the reference fingerprints corresponding to the identifiers included in the matching candidate group.

Advantageous Effects

According to the present invention, there can be provided an apparatus and method for recognizing content using an audio signal, which can maintain the accuracy and reliability of matching while promptly providing matching results.

Further, according to the present invention, a frame shift size which is an interval between the start points of frames is variably configured in a section having a large amount of information while an input audio signal is divided into a plurality of frames, thus maintaining accuracy and promptly providing matching results.

Furthermore, according to the present invention, a two-stage matching method is used in such a way that frames generated in a variable section are used for primary matching, wherein in primary matching, reference fingerprints having matching frames for respective frames are included in a plurality of matching candidate groups, and in such a way that, in secondary matching, a precise comparison is performed on references included in the matching candidate groups, thus providing a content recognition apparatus and method having promptness and accuracy.

DETAILED DESCRIPTION OF SPECIFIC EMBODIMENTS

Hereinafter, embodiments of the present invention will be described in detail with reference to the attached drawings.

Figure 1:
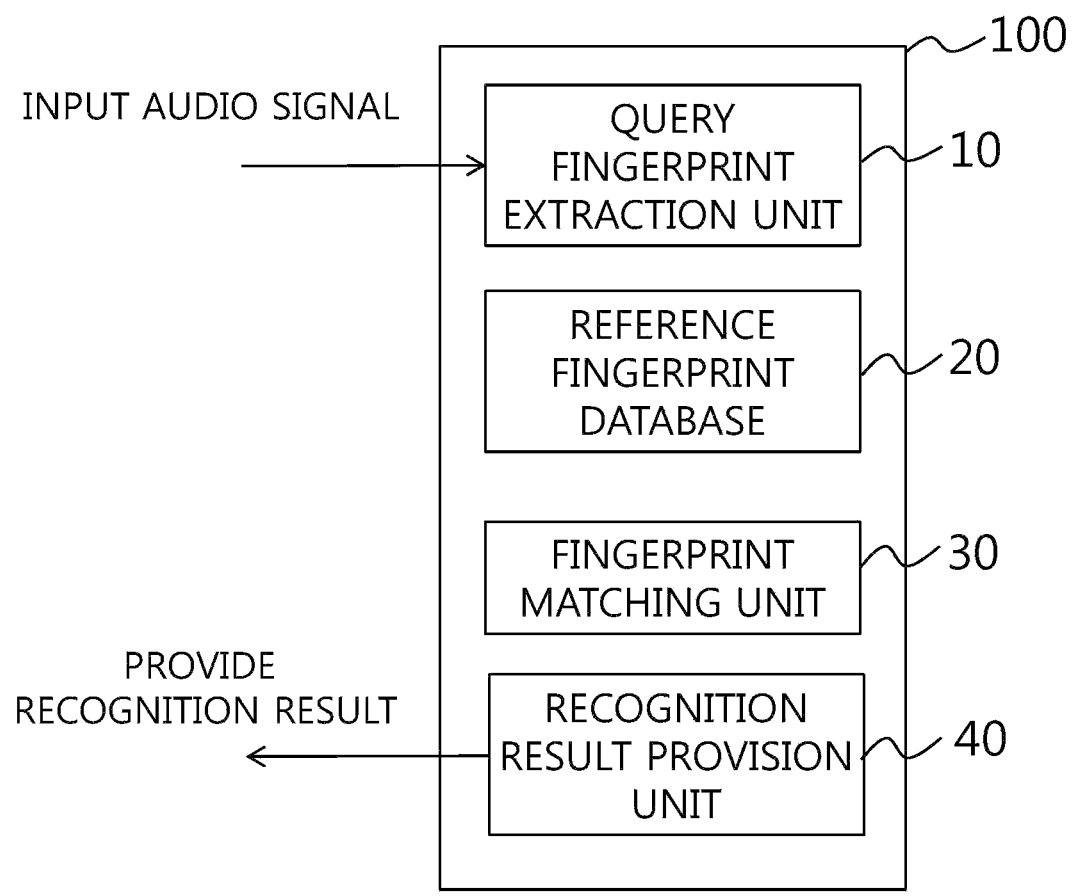
FIG. 1 is a diagram showing the configuration of an embodiment of a content recognition apparatus 100 using an audio signal according to the present invention.

FIG. 1 is a diagram showing the configuration of an embodiment of an apparatus 100 for recognizing content using an audio signal according to the present invention.

Referring to FIG. 1, the apparatus 100 for recognizing content using an audio signal (hereinafter referred to as a "content recognition apparatus") according to the present embodiment includes a query fingerprint extraction unit 10, a reference fingerprint database (DB) 20, a fingerprint matching unit 30, and a recognition result provision unit 40.

The query fingerprint extraction unit 10 forms a plurality of frames having a preset frame length for an input audio signal, and generates frame-based feature vectors for respective frames, thus functioning to extract a query, that is, a fingerprint to be compared. In this case, the plurality of frames are formed while a frame shift size that is an interval between the start points of neighboring frames is varied in a partial section.

Meanwhile, the term "fingerprint" denotes feature data indicative of the features of data, such as audio data, image data or video data, and is also referred to as fingerprint data, deoxyribonucleic acid (DNA) data or genetic data. As technology for extracting fingerprints and comparing data using the fingerprints, various schemes according to conventional technology have been proposed. When such a fingerprint is utilized, the identicalness of data can be easily determined, so that fingerprints have recently been widely used in the field of Digital Rights Management (DRM).

For example, in the case of audio signals, fingerprints can be generated using various types of feature data indicating the features of audio signals (for example, frequency, amplitude, etc.), and in the case of images or video signals, fingerprints can be generated using various types of feature data about image or video signals (for example, the motion vector information, color information, etc. of frames). The present invention does not intend to provide a method of generating such a fingerprint, and any type of conventional fingerprint generation/extraction method can be used without change, so that a detailed description thereof will be omitted here.

In accordance with patents filed by the present applicant, that is, Korean Patent Application Nos. 10-2007-0044251 (entitled "Audio fingerprint data generation method and apparatus and audio data comparison method and apparatus using the same"), 10-2007-0054601 (entitled "Method and apparatus for determining identicalness of video data and detecting identical section"), 10-2007-0060978(entitled "Method and system for clustering pieces of video data having identicalness"), 10-2007-0071633 (entitled "Method and apparatus for providing video data search service using video data clusters"), 10-2007-0091587 (entitled "Method and apparatus for setting and providing advertisement data using video data clusters"), and 10-2008-0051688 (entitled "Video processing method and apparatus"), methods of generating the fingerprints of audio, image or video data and comparing pieces of data using the fingerprints are disclosed, and it is apparent that the fingerprint generation and extraction methods proposed by the present applicant can be used in the present invention. In brief, the present invention can use conventional fingerprint generation/extraction technology without change, regardless of which type of fingerprint extraction scheme is used.

Figure 2:
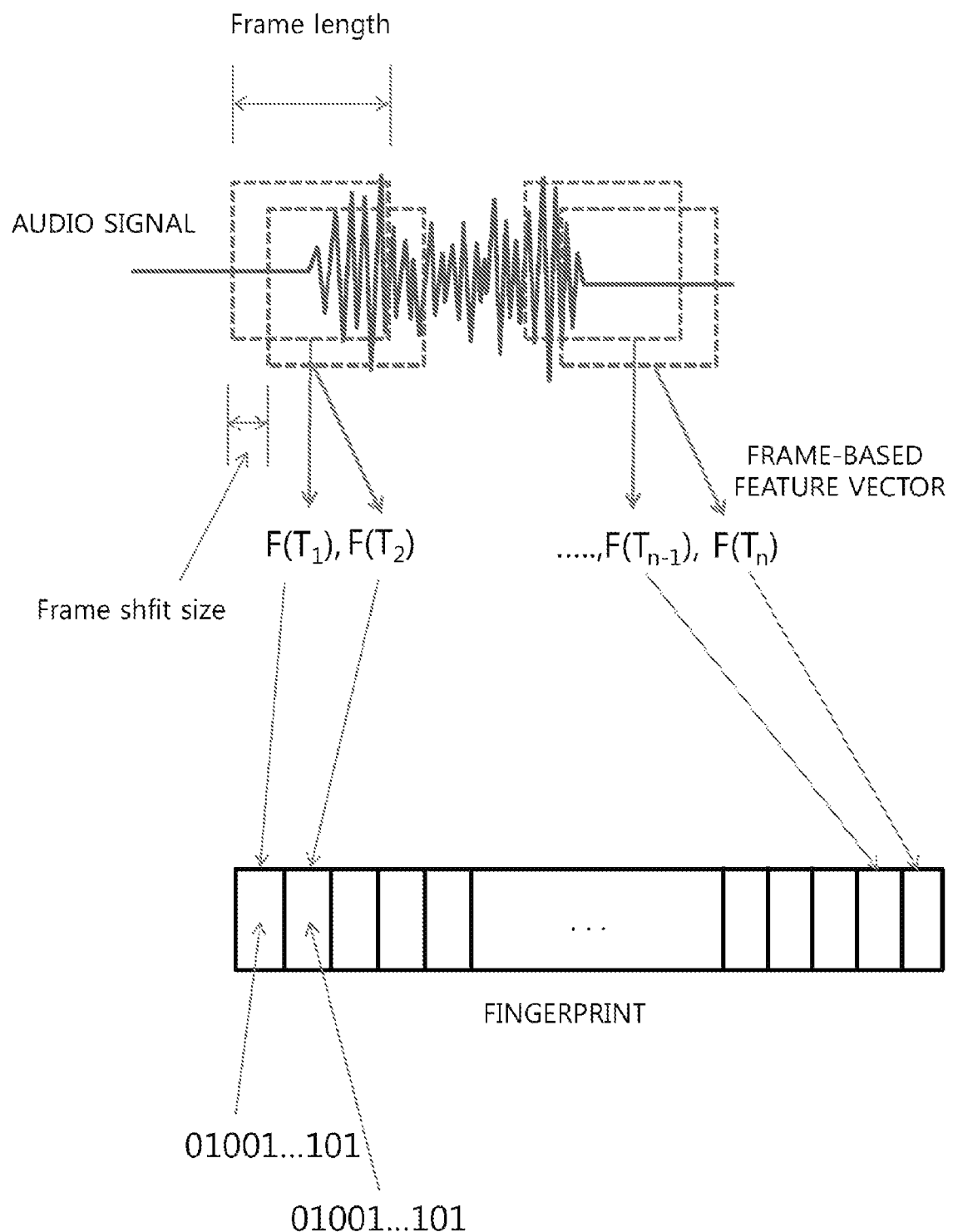
FIG. 2 is a diagram showing a method in which a query fingerprint extraction unit 10 forms frames and generates feature vectors for the respective frames.

FIG. 2 is a diagram showing a method in which the query fingerprint extraction unit 10 forms frames and generates feature vectors for respective frames.

Referring to FIG. 2, it can be seen that for an input audio signal, frames having a predetermined frame length are formed while the start points of the frames are spaced apart from one another by a predetermined frame shift size. The horizontal axis of the audio signal may be a time axis. When a frame-based feature vector for each frame $T_n$ is assumed to be $F(T_n)$, a final fingerprint for the given audio signal can be regarded as a set of frame-based feature vectors ($F(T_1)$, $F(T_2)$, $F(T_3)$, ..., $F(T_{n-1})$, $F(T_n)$), as shown in a lower portion of FIG. 2. Here, the frame-based feature vectors can be finally generated as binary vectors having the form of a binary number. In this case, the present invention is characterized in that a frame shift size is varied in a predetermined section of the audio signal.

Figure 3:
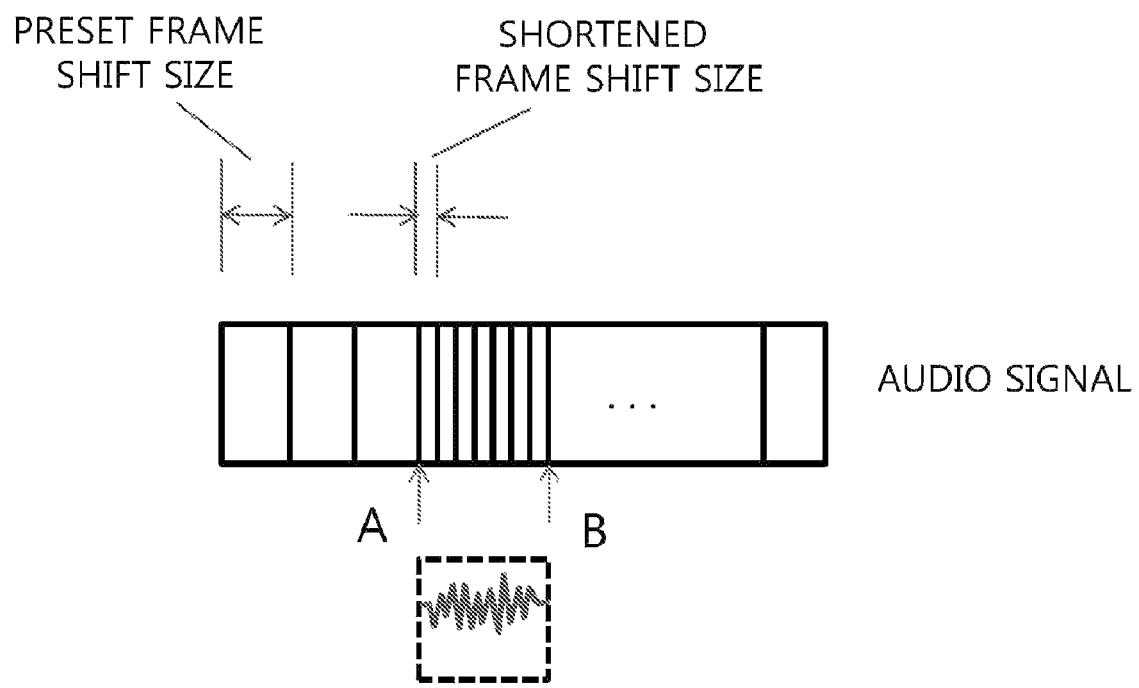
FIG. 3 is a diagram showing the case where a frame shift size is varied in a predetermined section.

FIG. 3 is a diagram showing the case where the frame shift size is varied in a predetermined section. Referring to FIG. 3, it can be seen that the frame shift size is varied, that is, shortened, from a preset frame shift size in the predetermined section A~B of the audio signal.

That is, from the first position of the audio signal, frames are formed at a preset frame size while the start points of the frames are moved by the preset frame shift size. In a specific section of the audio signal, the preset frame shift size is varied, that is, shortened, and then frames are formed while the start points of the frames are moved by the varied frame shift size, and frame-based feature vectors are extracted from the formed frames.

In FIG. 3 the frame shift size is shown as becoming shorter than the preset shift size, but the shift size may also be longer than the preset shift size. In this way, varying the frame shift size in the predetermined section is intended to generate fewer or more frames in consideration of the fact that the specific section of the audio signal contains a larger or smaller amount of information than that of other sections in many cases.

For example, when the specific section contains a larger amount of information than that of the remaining sections, more precise analysis will be required in the specific section. For this operation, when the number of frames that are generated is increased, a fingerprint containing a larger amount of information can be generated. Meanwhile, when the specific section contains a smaller amount of information, analysis can be more coarsely performed in the specific section. For this operation, the number of frames that are generated can be reduced.

Increasing the number of frames, that is, shortening the frame shift size, causes the number of frame-based feature vectors to increase, so that, as will be described later, the increased number of feature vectors can be very usefully used to match N candidate groups at high speed in the fingerprint matching unit, especially in a first matching unit. This fact will be described in detail later with reference to the matching unit 30.

Meanwhile, it is preferable that the frame shift size be formed such that, as shown in FIGS. 2 and 3, neighboring frames overlap each other on the basis of the time axis of the audio signal, which consequently means that the frame shift size is made shorter than the frame length. Of course, the present invention can be applied even to the case where the frame shift size is made equal to or greater than the frame length.

Meanwhile, the section of the audio signal in which the frame shift size is to be varied, for example, shortened, can be determined by, for example, the following criteria.

First, a specific time section is set, so that the frame shift size can be shortened in the time section. For example, the preset frame shift size can be assumed to be 20 ms, and the frame shift size can be varied to 5 ms during a time section of two seconds from the start point of the audio signal and during a time section of two seconds to the end point of the audio signal. As another method, the intermediate section of the audio signal, for example, a time section of 2 to 4 seconds, can be set to the section in which the frame shift size is to be shortened. In this way, in addition to the method of designating time sections, a method of designating previous and subsequent sections including the intermediate values of the entire time of the audio signal can also be used.

Further, it is also possible to use a method of receiving from a user the section in which the frame shift size is to be shortened and setting the section.

In this way, if the time section has been set, frames are formed while the start points of the frames are moved by the preset frame shift size before the corresponding time section. When the time reaches the preset time section, the frame shift size is shortened from the time point of the section, and frames are formed while the start points of the frames are moved by the shortened frame shift size. If the set time section has terminated, the procedure of forming frames while moving the start points of frames by the originally set frame shift size and of generating feature vectors for respective frames is repeated.

Meanwhile, the determination of the section in which the frame shift size is to be varied may also be performed using a Signal to Noise ratio (S/N ratio). A section in which the S/N ratio is high can be regarded as containing a larger amount of information, so that it is possible to previously calculate S/N ratios in respective predetermined time sections for the audio signal, determine a time section having an S/N ratio higher than a threshold, and shorten the frame shift size in the time section. Calculating the S/N ratio is well known in the conventional technology, and thus a detailed description thereof is omitted.

Through this procedure, the query fingerprint extraction unit 10 generates frame-based feature vectors for respective frames while generating the frames, thus generating a query fingerprint for the input audio signal. In this case, the detailed procedure of generating feature vectors for respective frames can be implemented using the conventional technology without change.

For example, the following methods can be used. That is, Fast Fourier Transformation (FFT) is performed on the input audio signal, so that a frequency domain spectrum is calculated. From the frequency domain spectrum, a power spectrum or a magnitude spectrum is calculated, and thereafter passes through a filter bank composed of N filters. Here, a single filter functions to extract only a signal component within a specific frequency range. When energy values are calculated on signal components extracted by the respective filters by using a typical signal processing method, Nth order filter bank energy can be obtained, and these values can be used as feature vectors for respective frames.

Meanwhile, as described above, the query fingerprint extraction unit 10 may use a method that exploits surrounding frame fingerprints, instead of directly generating fingerprints for respective frames, for frames to be included in the section in which the frame shift size is to be shortened.

Referring to FIG. 3, when the number of frames belonging to section A~B, that is, frames belonging to the section in which the frame shift size is to be shortened, is assumed to be, for example, 10, 10 frame-based feature vectors can be generated using linear interpolation between neighboring frame fingerprints.

Figure 4:
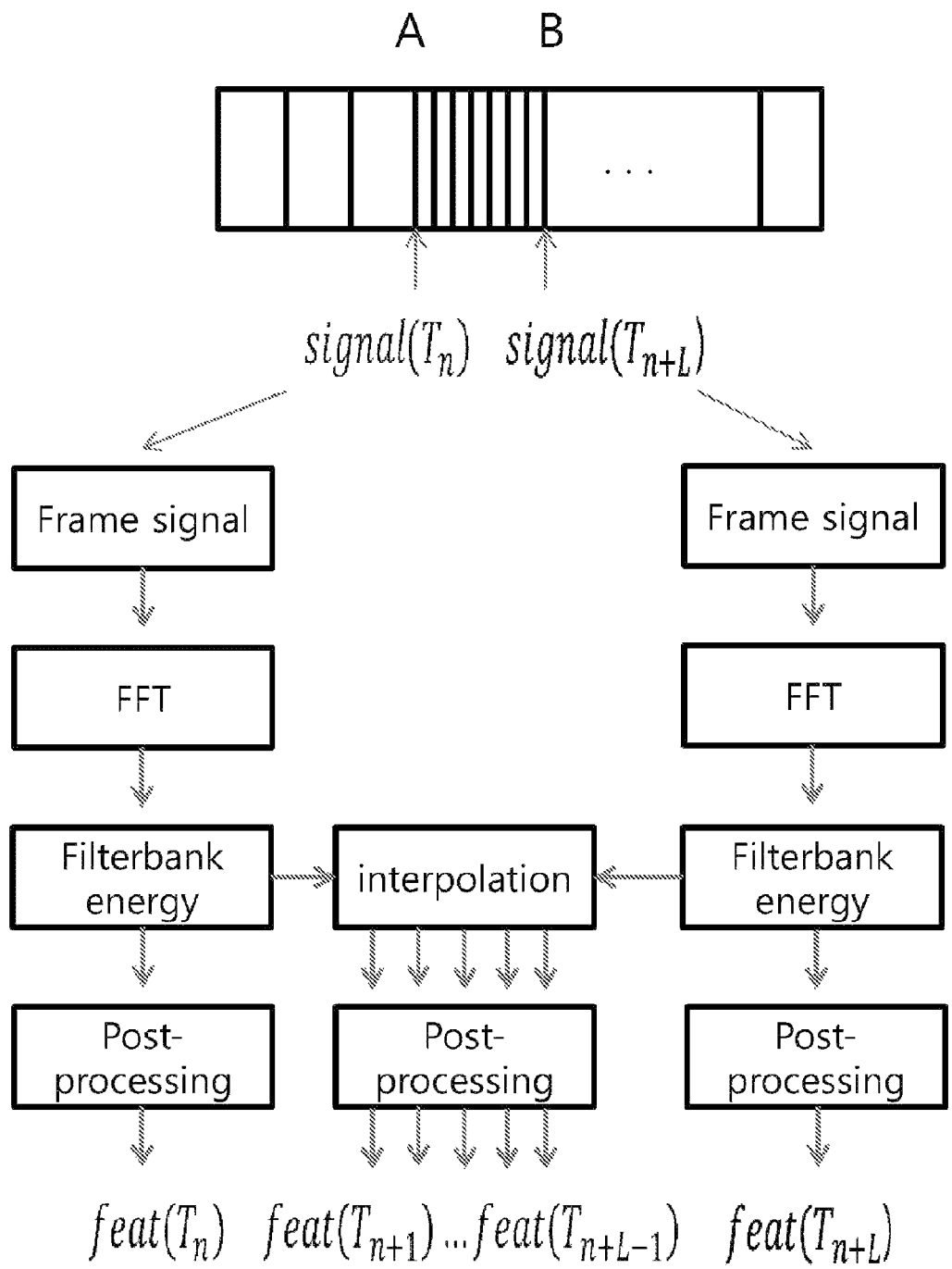
FIG. 4 is a diagram showing a procedure of generating frame fingerprints using neighboring frame fingerprints.

FIG. 4 is a diagram showing the procedure of generating frame fingerprints using neighboring frame fingerprints.

Referring to FIG. 4, section A~B of an audio signal is a section in which the frame shift size is shortened, L frames are formed in section A~B, and frame-based feature vectors must be generated for the respective frames. In this case, frame-based feature vectors for the L frames are calculated such that frame-based feature vectors are respectively calculated for a previous frame having the start position of section A~B as a last position and a subsequent frame having the end position of section A~B as a first position ($T_n$, $T_{n+L}$), and such that linear interpolation is applied based on these frame-based feature vectors, so that frame-based feature vectors can be respectively generated for the L frames. For example, when the value of $T_n$ is 1, and the value of $T_{n+L}$ is 10, and eight frames are included in the section, the feature vectors of the respective frames can be determined to be 2, 3, 4, 5, 6, 7, 8, and 9 using linear interpolation.

When this method is used, the number of frames is increased, so that there is an advantage in that more precise analysis can be performed in a signal section having a larger amount of information without greatly increasing the computational complexity.

Figure 5:
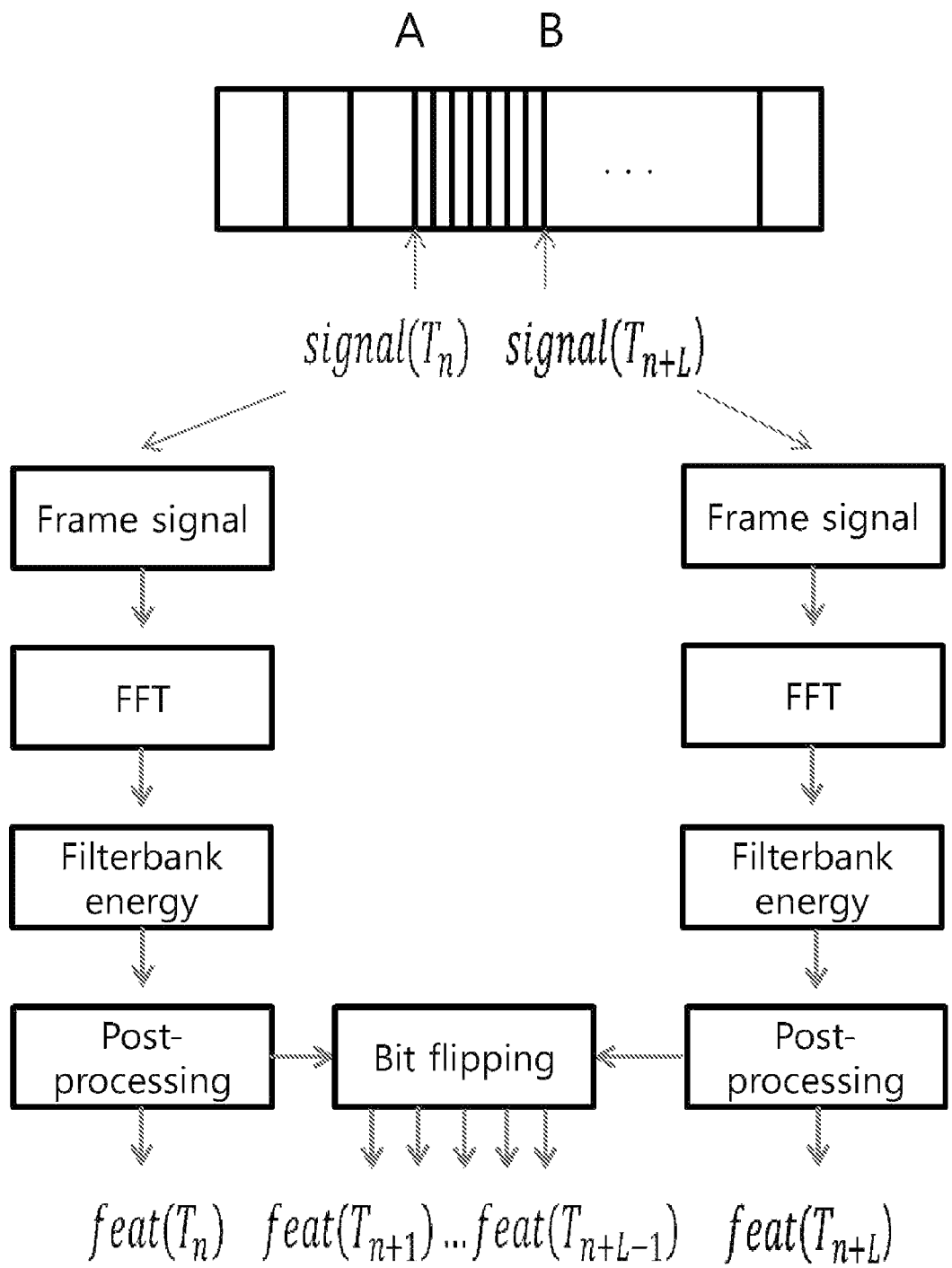
FIG. 5 is a diagram showing another method of generating frame fingerprints using neighboring frame fingerprints.

FIG. 5 is a diagram showing another method of generating frame fingerprints using neighboring frame fingerprints.

The method of FIG. 5 is similar to that of FIG. 4, but is characterized in that feature vectors for frames to be included in a section in which the shift size is shortened are generated using the comparison of bits. The frame-based feature vectors can be finally generated in the form of binary numbers using the above-described method, wherein when individual bits of the frame-based feature vectors of neighboring frames are compared with one another, non-identical bits are discovered, so that possible binary numbers are applied to the discovered bits (bit flipping), and thus feature vectors for the frames to be included in section A~B can be generated. For example, when the number of different bits is R, $2^R$ frame-based feature vectors can be generated, thus enabling $2^R$ frames to be inserted into section A~B. In this case, the frame shift size of section A~B is determined by R.

Referring back to FIG. 1, other components of the content recognition apparatus 100 will be described below.

The reference fingerprint database (DB) 20 functions to store reference fingerprints to be compared with the query fingerprint and pieces of content information corresponding to the reference fingerprints. That is, the fingerprints, used as references to be compared with the query fingerprint, and pieces of content information about the fingerprints are stored. Then, as described above, if a query fingerprint is extracted by the query fingerprint extraction unit 10, the fingerprint matching unit 30, which will be described later, compares the query fingerprint with reference fingerprints stored in the reference fingerprint DB 20, and determines a reference fingerprint matching the query fingerprint.

In this case, the content information includes the identifier (ID) of content, and may include the title, copyright holder, length, video quality information, file name, and description data of the content, and other pieces of related data.

The reference fingerprint DB 20 may also be configured to receive reference fingerprints and content information from an external separate reference fingerprint server over a network.

Meanwhile, the fingerprint matching unit 30 functions to determine a reference fingerprint matching the query fingerprint. As described above, the query fingerprint extraction unit 10 extracts the query fingerprint, and the fingerprint matching unit 30 compares the query fingerprint with reference fingerprints stored in the reference fingerprint DB 20, and then determines the reference fingerprint matching the query fingerprint.

Figure 6:
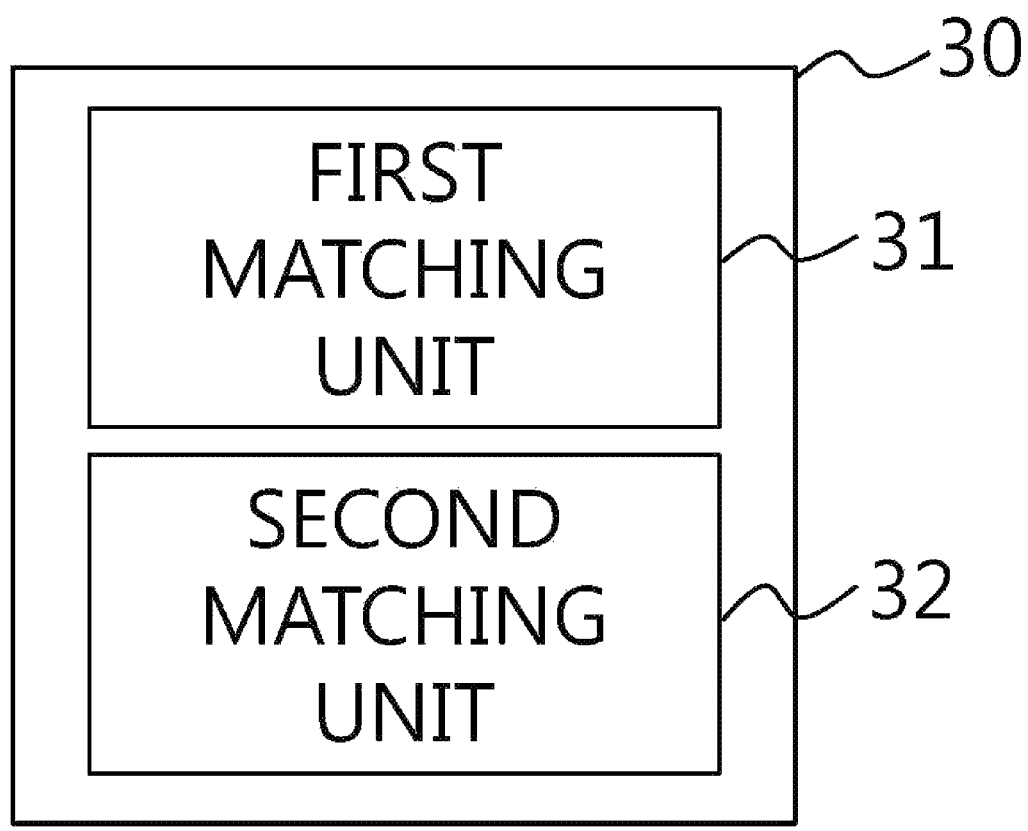
FIG. 6 is a diagram showing the configuration of a fingerprint matching unit 30.

FIG. 6 is a diagram showing the configuration of the fingerprint matching unit 30. Referring to FIG. 6, the fingerprint matching unit 30 includes a first matching unit 31 and a second matching unit 32.

The first matching unit 31 first configures a plurality of matching candidate groups by selecting reference fingerprints matching the query fingerprint using, for example, an N-best method, and the second matching unit 32 performs precise analysis on the reference fingerprints included in the matching candidate groups, thus providing the results of more accurate matching.

The first matching unit 31 can use a method of determining whether even one matching fingerprint is present for each frame so as to select a plurality of matching candidate groups.

Figure 7:
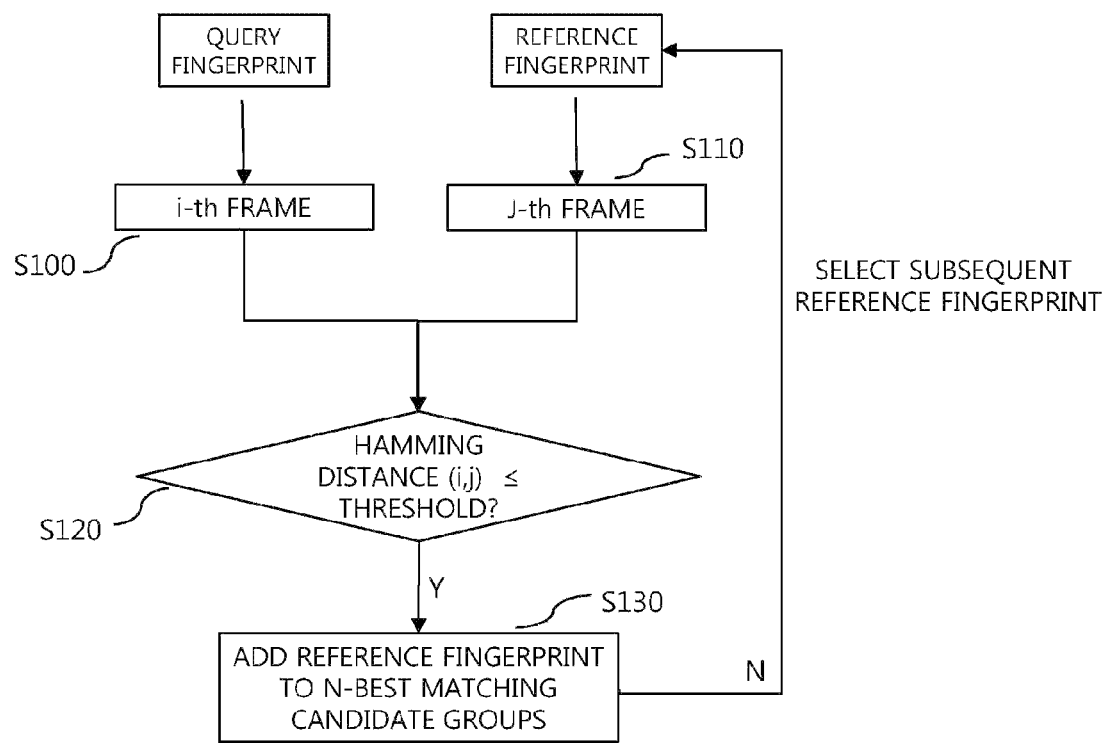
FIG. 7 is a diagram showing the operation of a first matching unit 31.

FIG. 7 is a diagram showing the operation of the first matching unit 31.

Referring to FIG. 7, the first matching unit 31 selects a reference fingerprint to be compared with a query fingerprint from the reference fingerprint DB 20, compares the frame-based feature vectors of the i-th frame of the query fingerprint and the j-th frame of the selected reference fingerprint with each other, and then determines whether, for example, a Hamming distance between them is equal to or less than a preset threshold (S100, S110, and S120).

Here, the i-th frame of the query fingerprint and the j-th frame of the selected reference fingerprint can be sequentially selected from the first frames of the fingerprints. That is, a Hamming distance is determined while i and j values are sequentially increased from first frames of the query fingerprint and the selected reference fingerprint.

For example, the first frame (i=1) of the query fingerprint is selected and the first frame (j=1) of the reference fingerprint is selected, so that it is determined whether a Hamming distance between the frame-based feature vectors of the corresponding frames is equal to or less than the threshold (S120).

If the Hamming distance is equal to or less than the threshold, the reference fingerprint is added to the matching candidate groups (S130), a comparison of the remaining frames of the corresponding reference fingerprint is skipped, a subsequent reference fingerprint is selected, and the procedure of FIG. 7 is repeated on the subsequent reference fingerprint.

If the Hamming distance is not equal to or less than the threshold, j is increased by 1, the procedure of determining whether a Hamming distance between the frame-based feature vectors of a subsequent frame (j=2) of the reference fingerprint and the first frame (i=1) of the query fingerprint is equal to or less than the threshold is repeated. During this procedure, when the case where a Hamming distance is equal to or less than the threshold is discovered, the corresponding reference fingerprint is added to the matching candidate groups, as described above, a comparison of the remaining frames is skipped, and a subsequent reference fingerprint is selected.

If the case where the Hamming distance is equal to or less than the threshold is not discovered even for the last frame of the corresponding reference fingerprint, i is increased by 1 to select a subsequent frame of the query fingerprint, and j=1 is set again, so that the above-described procedure is repeated.

Through the above procedure, in the case where even one of the frames of the given query fingerprint that matches the reference fingerprint (that is, the Hamming distance is equal to or less than the threshold) is discovered, the corresponding reference fingerprint is immediately added to the matching candidate groups, and a comparison of the remaining frames of the corresponding reference fingerprint is omitted, thus enabling N matching candidate groups to be determined at high speed.

Since such a method is to compare feature vectors for respective frames, accuracy may be decreased, but, as described above, a larger number of frames are generated by the query fingerprint extraction unit 10 in the section in which the frame shift size is shortened, thus maintaining accuracy at its highest possible value.

Meanwhile, adding the matching reference fingerprint to the matching candidate groups means that the identifier (ID) of the corresponding reference fingerprint is included in the matching candidate groups.

Further, in the above-described method, the method of sequentially comparing frames starting from the first frame has been described by way of example, but there is no need to necessarily use this method, and a method of randomly selecting frames or a method of first selecting an intermediate frame and moving to previous and subsequent frames can also be used. It is important to perform a comparison on a frame basis, and if any one matching frame is discovered, to omit a comparison of the remaining frames for the corresponding reference fingerprint, thus enabling high-speed matching while maintaining accuracy.

If N matching candidate groups have been determined through the above procedure, the second matching unit 32 performs secondary matching between the reference fingerprints included in the corresponding matching candidate group and the query fingerprint.

As described above, the second matching unit 32 performs the function of comparing reference fingerprints corresponding to the identifiers of reference fingerprints included in the matching candidate groups determined by the first matching unit 31 with the query fingerprint, and then generating the final matching results.

The matching method used by the second matching unit 32 to perform secondary matching is the method of obtaining more accurate results than those of the primary matching performed by the first matching unit 31. For this, the second matching unit 32 performs secondary matching with the exception of the feature vectors of frames that have been generated by the query fingerprint extraction unit 10 while varying (shortening) the frame shift size as described above.

That is, the query fingerprint is reconstructed using only the feature vectors of the frames having the preset frame shift size, and is precisely compared with the reference fingerprints included in the matching candidate groups, so that the final matching results are calculated.

Meanwhile, the matching method performed by the second matching unit 32 can be implemented using all conventional well-known methods, and this method itself is not a direct object of the present invention, and thus a detailed description thereof will be omitted.

Referring back to FIG. 1, the recognition result provision unit 40 will be described below.

Through the above-described procedure, the recognition result provision unit 40 functions to provide content information corresponding to a reference fingerprint finally determined by the fingerprint matching unit 30. Here, as described above, the content information may include various types of information, such as a content identifier, a content name, a copyright holder, a content length, and video quality information corresponding to the reference fingerprint that has been determined to match the query fingerprint, and these types of information are stored in the reference fingerprint DB 20, as described above.

Figure 8:
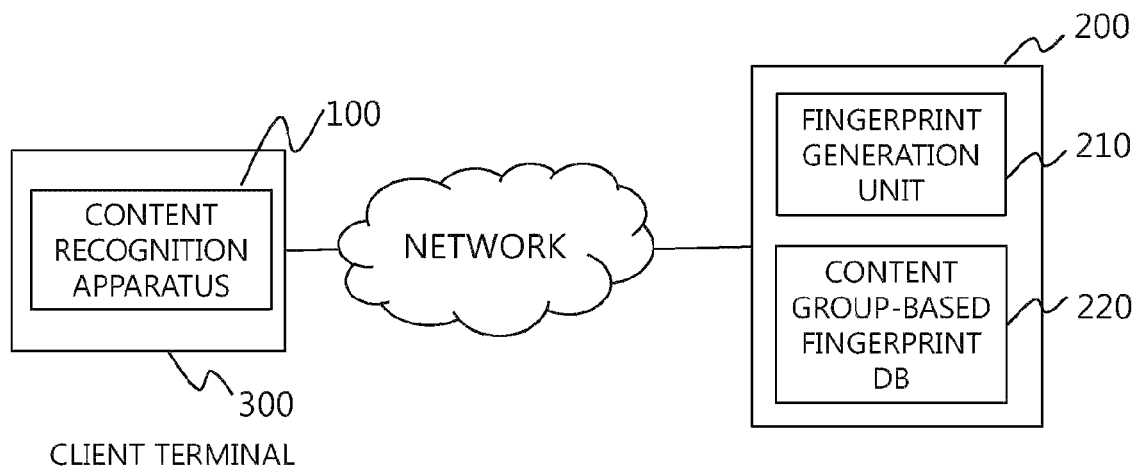
FIG. 8 is a diagram showing the state of connection and arrangement of the content recognition apparatus 100.

FIG. 8 is a diagram showing the state of connection and arrangement of the content recognition apparatus 100.

Referring to FIG. 8, the content recognition apparatus 100 may be provided in a client terminal 300, and the client terminal 300 may be connected to a reference fingerprint server 200 over a network such as the Internet or a mobile communication network.

The client terminal 300 may be a computer or a mobile communication terminal, for example, a smart phone.

As shown in FIG. 8, the reference fingerprint server 200 may include a fingerprint generation unit 210 and a content group-based fingerprint DB 220.

The fingerprint generation unit 210 performs the function of generating fingerprints for all audio signals that are targeted for the generation of fingerprints. The fingerprints generated here, together with content information corresponding to each fingerprint, are stored in the content group-based fingerprint DB 220.

The content group-based fingerprint DB 220 groups the fingerprints, generated by the fingerprint generation unit 210, and pieces of content information, and stores the fingerprints and the content information for respective groups. The storage for respective groups can be performed using various criteria, and, for example, grouping can be performed in accordance with specific content. For example, all fingerprints and pieces of content information corresponding to the song titled "AAA" can be grouped together.

As another method, groups are set by the manager of the reference fingerprint server 200 for respective pieces of content, thus enabling grouping to be accomplished.

As described above, the reference fingerprint server 200 constructs a grouped fingerprint DB, and transmits the grouped fingerprint DB to the client terminal 300, and the reference fingerprint DB 20 of the content recognition apparatus 100 of the client terminal 300 receives and stores the grouped fingerprint DB.

As the configuration has been made in this way, once the recognition has been completed (that is, matching has been completed) by the client terminal 300, the client terminal 300 may be configured to simultaneously transmit the results of recognition both to the user and to the reference fingerprint server 200 via the recognition result provision unit 40. In this case, the reference fingerprint server 200 can determine whether a specific user actually listened to an audio signal for grouped content and recognized the content, for each piece of grouped content. Therefore, when this configuration is applied to an advertising method, specific users can recognize specific content and the results of the recognition of the specific content can be aggregated by the server, thus obtaining the advantage of usefully using the configuration for the purpose of creating advertising effects or events.

Meanwhile, referring back to FIG. 1, the content recognition apparatus 100 may further include an interface provision unit (not shown). The interface provision unit performs the function of providing a user interface for allowing a user to input an audio signal while providing the results of the recognition to the user.

For example, an audio signal recognition start button is provided via the user interface, so that when the user clicks the corresponding button, an audio signal can be obtained for a predetermined period of time using a voice input means, such as a microphone. Further, if recognition (matching) has been completed by the user interface, content information can be provided to the user in the form of, for example, "A recognized audio signal is a song titled 'bbb' by the singer 'aaa'."

Meanwhile, as described above with reference to FIGS. 1 to 8, the query fingerprint extraction unit 10 generates frame-based feature vectors for respective frames configured with a predetermined frame length and a frame shift size from an input audio signal, and then extracts a query fingerprint.

In this case, when the query fingerprint is extracted, it is possible to set a predetermined time section, extract a query fingerprint in each time section, perform matching, and perform extraction and matching while lengthening the time section if matching has failed in the corresponding time section.

For example, when the unit of the time section is N seconds, the audio signal can be divided into sections $N_1$, $N_2$, $N_3$, ..., $N_K$. Here, N is a value much greater than the above-described frame length. In regard to the time section, in section $N_1$, the above-described query fingerprint extraction and matching are performed. If matching has failed in section $N_1$, query fingerprint extraction and matching can be performed in subsequent section $N_2$. If matching has succeeded while this procedure is being repeated, the procedure is terminated, whereas if matching has continuously failed, the query fingerprint extraction and matching are performed on frames in the corresponding section, as described above, while continuously moving to a subsequent section.

Here, the sizes of the time sections are preferably set to an identical size, but it is apparent that they can have different sizes.

Further, when query fingerprint extraction and matching are performed in, for example, section $N_2$, the query fingerprint extracted in section $N_1$ can be used as well.

Figure 9:
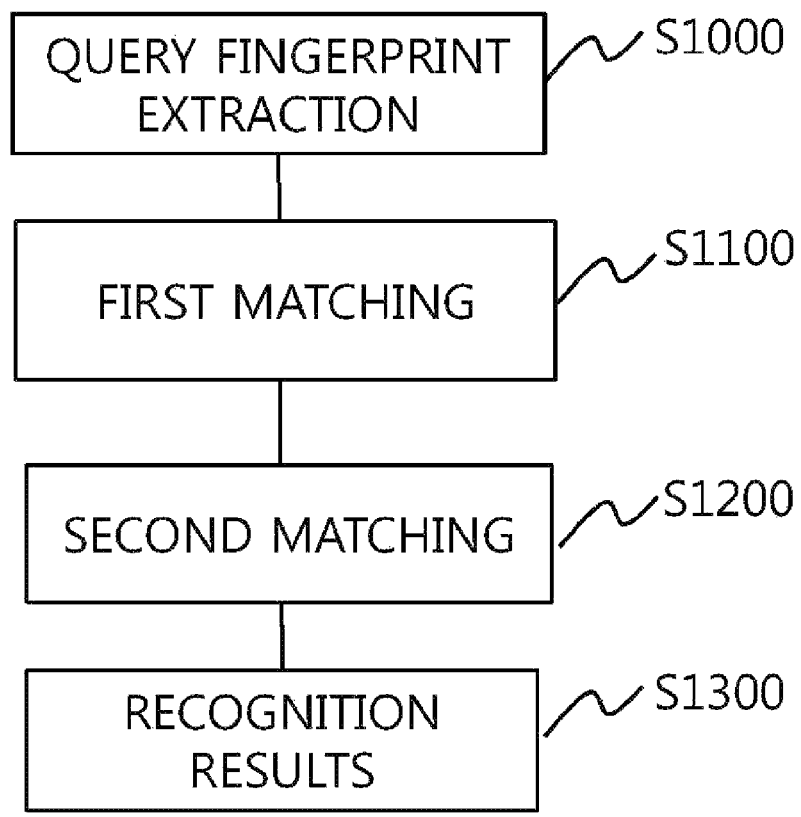
FIG. 9 is a flowchart showing a content recognition method performed by the content recognition apparatus 100 according to the present invention.

FIG. 9 is a flowchart showing a content recognition method performed by the content recognition apparatus 100 according to the present invention described in FIGS. 1 to 8.

Referring to FIG. 9, the query fingerprint extraction unit 10 extracts a query fingerprint using the above-described method (S1000). When the query fingerprint is extracted, the first matching unit 21 of the fingerprint matching unit 20 first performs first matching (S1100). The results of the first matching by the first matching unit 21 are used to determine N matching candidate groups, as described above.

Next, the second matching unit 22 of the fingerprint matching unit 20 performs second matching on the reference fingerprints included in the matching candidate groups (S1200), and generates final matching results as the results of recognition (S1300).

As described above, although the preferred embodiments of the present invention have been described, it is apparent that the present invention is not limited by these embodiments.

For example, in the above embodiments, a description has been made such that query fingerprints are extracted from audio signals and are matched, but it is apparent that the present invention is applied to video signals without change. The reason for this is that the only difference between video and audio signals is the method of generating feature vectors, and the above methods of configuring the frames can be applied to video signals without change.

Further, in FIG. 7, methods of comparing Hamming distances upon comparing frames have been described by way of example, but it is apparent that conventional methods other than Hamming distances can also be used.

Furthermore, in FIG. 8, the content recognition apparatus 100 has been described as being integrated into and included in the client terminal 300, but the individual components of the content recognition apparatus 100 can be distributed and arranged on the network. For example, only the query fingerprint extraction unit 10 and the interface provision unit (not shown) may be included in the client terminal 300, and other components may be distributed and arranged as independent servers on the network. For example, the reference fingerprint DB and the fingerprint matching unit may be respectively arranged in separate servers, and these two components may also be integrated and arranged in a single server. Furthermore, these two components may be arranged in the reference fingerprint server 200. It is important that the content recognition apparatus 100 can be physically configured as a single device or in a single device, yet it can still be distributed and arranged on the network.

What is claimed is:

1. An apparatus for recognizing content using an audio signal, comprising:

at least one computer processor for executing commands that direct operations of the apparatus, and a memory operatively coupled to the at least one processor, the memory storing instructions operable when executed with the at least one processor;

a query fingerprint extraction unit for forming frames having a preset frame length for an input audio signal, and generating frame-based feature vectors for respective frames, thus extracting a query fingerprint for the input audio signal;

a reference fingerprint database (DB) for storing reference fingerprints to be compared with the query fingerprint and pieces of content information corresponding to the reference fingerprints; and a fingerprint matching unit for determining a reference fingerprint matching the query fingerprint, wherein the query fingerprint extraction unit forms the frames while varying a frame shift size that is an interval between start points of neighboring frames in a partial section such that the frame shift size of the frames in the partial section is shorter than a preset frame shift size of the other frames, wherein the query fingerprint extraction unit generates frame-based feature vectors for frames corresponding to start position and end position of the partial section and generates the frame-based feature vectors of the other frames included in the partial section by using linear interpolation based on the generated frame-based feature vectors for frames corresponding to start position and end position of the partial section, or wherein the query fingerprint extraction unit generates frame-based feature vectors in a form of binary numbers for frames corresponding to start position and end position of the partial section and generates the frame-based feature vectors of the other frames included in the partial section by comparing individual bits of the frame-based feature vectors corresponding to start position and end position of the partial section and by arranging possible binary numbers in different bits, and wherein the frame corresponding to the start position of the partial section is a frame having the start position as a last position of the frame, and the frame corresponding to the end position of the partial section is a frame having the end position as a first position of the frame.

2. The apparatus according to claim 1, wherein the frame shift size is shorter than the frame length so that neighboring frames overlap each other.

3. The apparatus according to claim 1, wherein the query fingerprint extraction unit determines the partial section based on a preset time section.

4. The apparatus according to claim 1, wherein the query fingerprint extraction unit detects a time section in which a Signal to Noise (S/N) ratio has a value greater than a threshold, and determines the partial section based on the detected time section.

5. The apparatus according to claim 3 or 4, wherein the query fingerprint extraction unit generates frame-based feature vectors for respective frames corresponding to the determined partial section.

6. The apparatus according to claim 1, wherein the fingerprint matching unit comprises: a first matching unit for performing primary matching by determining reference fingerprints including a frame-based feature vector matching any one of the frame-based feature vectors constituting the query fingerprint, and by including identifiers of the determined reference fingerprints in a matching candidate group; and a second matching unit for performing secondary matching on the reference fingerprints corresponding to the identifiers included in the matching candidate group.

7. The apparatus according to claim 6, wherein the first matching unit determines a reference fingerprint including a frame-based feature vector, from which a Hamming distance to any one of the frame-based feature vectors constituting the query fingerprint is equal to or less than a threshold, to be a matching reference fingerprint.

8. The apparatus according to claim 6, wherein the first matching unit is configured such that if a matching frame is detected while the frame-based feature vectors constituting the query fingerprint are sequentially compared with the frame-based feature vectors of each reference fingerprint, a comparison of remaining frames is omitted and a comparison of a subsequent reference fingerprint is performed.

9. The apparatus according to claim 6, wherein the second matching unit reconstructs frame-based feature vectors, with exception of frames other than frames corresponding to the preset frame shift size from frame-based feature vectors constituting the query fingerprint, and compares the reconstructed frame-based feature vectors with the reference fingerprints.

10. The apparatus according to claim 1, further comprising a recognition result provision unit for providing content information corresponding to the reference fingerprint determined by the fingerprint matching unit.

11. The apparatus according to claim 1, wherein the content recognition apparatus using an audio signal is included in a client terminal.

12. The apparatus according to claim 11, wherein the reference fingerprint DB receives the reference fingerprints and the content information from a reference fingerprint server, and stores the reference fingerprints and the content information.

13. The apparatus according to claim 1, further comprising an interface provision unit for providing a user interface allowing a user to input an audio signal.

14. The apparatus according to claim 12, wherein content information corresponding to the reference fingerprint determined by the fingerprint matching unit is transmitted to the reference fingerprint server.

15. The apparatus according to claim 1, wherein: the query fingerprint extraction unit extracts section-based query fingerprints by generating frame-based feature vectors for frames included in each preset section, and the fingerprint matching unit determines a reference fingerprint matching each query fingerprint, and the query fingerprint extraction unit continuously extracts section-based query fingerprints in the respective preset sections until a matching reference fingerprint is determined by the fingerprint matching unit.

16. A method of recognizing content using an audio signal, comprising:

1) forming frames having a preset frame length for an input audio signal, and generating frame-based feature vectors for respective frames, thus extracting a query fingerprint; and 2) determining a reference fingerprint matching the query fingerprint, wherein 1) is configured to form the frames while varying a frame shift size that is an interval between start points of neighboring frames in a partial section such that the frame shift size of the frames in the partial section is shorter than a preset frame shift size of the other frames, wherein 1) is configured to generate frame-based feature vectors for frames corresponding to start position and end position of the partial section and generate the frame-based feature vectors of the other frames included in the partial section by using linear interpolation based on the generated frame-based feature vectors for frames corresponding to start position and end position of the partial section, or wherein 1) is configured to generate frame-based feature vectors in a form of binary numbers for frames corresponding to start position and end position of the partial section and generate the frame-based feature vectors of the other frames included in the partial section by comparing individual bits of the frame-based feature vectors corresponding to start position and end position of the partial section and by arranging possible binary numbers in different bits, and wherein the frame corresponding to the start position of the partial section is a frame having the start position as a last position of the frame, and the frame corresponding to the end position of the partial section is a frame having the end position as a first position of the frame.

17. The method according to claim 16, wherein 2) comprises: 2-1) performing primary matching by determining reference fingerprints matching any one of the frame-based feature vectors constituting the query fingerprint, and by including identifiers of the determined reference fingerprints in a matching candidate group; and 2-2) performing secondary matching on the reference fingerprints corresponding to the identifiers included in the matching candidate group.

\* \* \* \* \*